Nov. 10, 1925.

H. W. ASIRE 1,561,046

EXHAUST FAN

Filed May 11, 1923 2 Sheets-Sheet 1

Patented Nov. 10, 1925.

1,561,046

UNITED STATES PATENT OFFICE.

HORACE W. ASIRE, OF DAYTON, OHIO, ASSIGNOR TO GENERAL MOTORS RESEARCH CORPORATION, OF DAYTON, OHIO, A CORPORATION OF DELAWARE.

EXHAUST FAN.

Application filed May 11, 1923. Serial No. 638,402.

*To all whom it may concern:*

Be it known that I, HORACE W. ASIRE, a citizen of the United States of America, residing at Dayton, county of Montgomery, and State of Ohio, have invented certain new and useful Improvements in Exhaust Fans, of which the following is a full, clear, and exact description.

This invention relates to centrifugal fans and is especially useful for exhaust fans.

An object of this invention is to increase the capacity and efficiency of the fan and to reduce the noise of operation thereof.

Further objects and advantages of the present invention will be apparent from the following description reference being had to the accompanying drawings wherein preferred embodiments of the present invention are clearly shown.

In the drawings.

Similar reference characters refer to similar parts throughout the several views.

Figure 1:
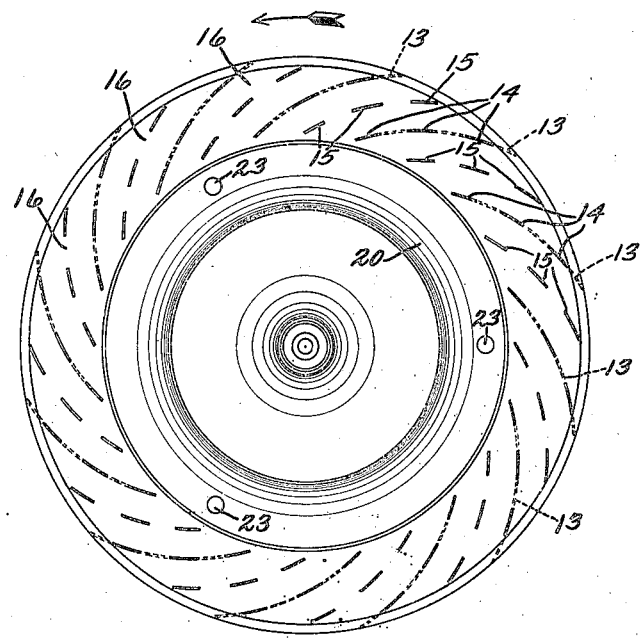
Fig. 1 is an elevation of the fan wheel from the inlet side, and shows the slightly curved impelling vanes in dotted lines.
Figure 2:
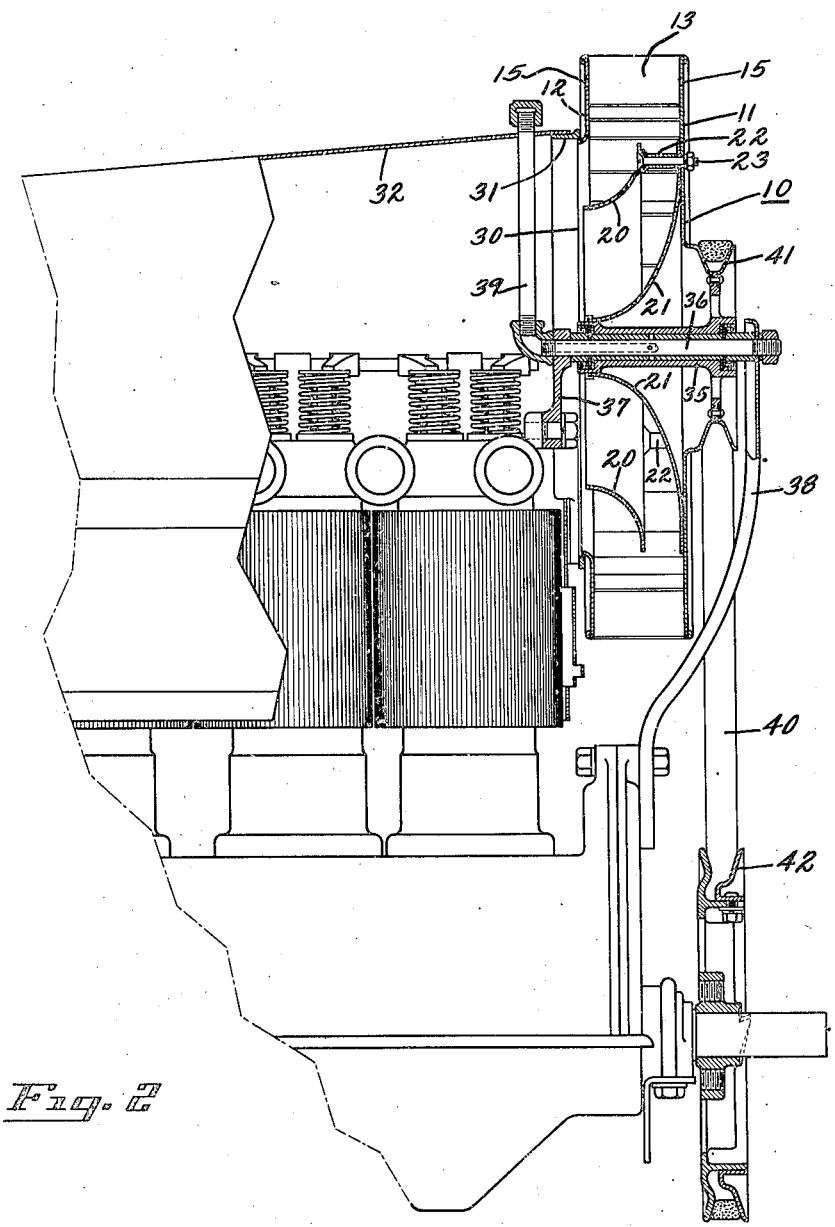
Fig. 2 shows a section through the fan wheel, as well as its location and connections when used for drawing air through a draft tube for cooling an internal-combustion engine.

The fan wheel designated in its entirety by numeral 10, is composed of two side plates 11 and 12 which have a series of impelling vanes 13 rigidly attached thereto by any suitable means. The method of attachment illustrated in Fig. 1, has been found very satisfactory. Each of the vanes 13 is provided with one or more projections or lugs 14 on each side which extend through corresponding slots in the side plates 11 and 12 and are riveted over on the outside to form a rigid construction. The vanes 13 may be straight or curved and set at any desired angle according to the characteristics for which the fan is designed. The curvature and angle of the vanes 13 as illustrated in Fig. 1, has been found to give very good results for the purpose of exhausting air from a draft tube as shown in Fig. 2. It was discovered however, that the hissing or whistling noise from the operation of the fan could be very greatly reduced simply by providing the small holes 15 through the side plates 11 and 12 to permit a small amount of air to enter laterally into the air stream between the vanes 13. These holes 15 may be provided in only one side plate or in both and may be variously shaped and located as desired, however, the best results have been obtained by providing narrow slots substantially as shown in Fig. 1 and located midway between the vanes 13.

The method of operation of these slots 15 is as follows: The passageway between two vanes 13 forms a pipe or nozzle 16 through which the air rushes. The inner edge of the vanes 13, being sharp and probably not exactly streamlined with the rushing air, sets up a sound wave which is reinforced by the pipe 16 after the manner of the pipes of a pipe organ. If however, the slots 15 are provided, a small amount of air rushes laterally into the pipe 16 and so breaks up the sound wave passing therethrough, thus destroying the reinforcing effect of the pipe. In the case of slots in the vanes 13, a small amount of air rushes from the high pressure side to the low pressure side of the vane and so breaks up the sound wave in somewhat the same manner. It is of course to be understood that this explanation is given merely as a theory and that the invention is not in any way to be bound by the correctness of this theory. It has been found to produce practical results and the above description will enable others skilled in the art to practice the invention regardless of the actual manner in which the invention operates.

In order to further decrease the noise and increase the efficiency of the fan a flaring inlet cone 20 is provided which assists in turning the air from an axial direction of flow to a radial direction and so distributes the air stream more uniformly over the full length of the vanes 13. A flaring hub cone 21 is also provided for the same purpose as will be well understood by those skilled in the art. Without the cone 20 however it has been found that the air entering the inlet area 30 tends to crowd against the side plate 11 and leave the side plate 12, which of course has the tendency to increase the exit velocity adjacent the plate 11 and decrease it to a very small amount adjacent the plate 12. Obviously this effect will decrease the efficiency in every way and will increase the noise due to the higher maximum velocity of the air over a portion of the length of vanes 13. The cone 20 is preferably so located as to divide the inlet area 30 into two approximately equal parts and after giving the entering air stream an easy turn to distribute it uniformly over the length of the vanes 13. This will cause the exit velocity of the air to be more uniform from side plate 11 to side plate 12 and hence will reduce the maximum exit velocity.

The cone 20 is shown rigidly secured to the side plate 11 by means of the spacer tubes 22 and the bolts 23. The flaring hub cone 21 may be also secured in place by the same bolts 23, as shown. The side plate 12 is flared out at the inlet 30 to give an easy turn to the entering air and to overlap the inlet ring 31 of the draft tube 32 to reduce leakage. The fan hub 35 is mounted upon the spindle 36 supported upon suitable brackets 37 and 38. The wheel 10 is driven by the belt 40, the pulley 41 made integral with the fan wheel, and the pulley 42 on the engine crank shaft.

While the forms of embodiment of the invention as herein disclosed, constitute preferred forms, it is to be understood that other forms might be adopted, all coming within the scope of the claims which follow.

What is claimed is as follows:

1. A centrifugal fan of the class described comprising a side plate; a driving pulley carried by said side plate; a second side plate spaced apart from said first mentioned plate and having an opening through which air may enter the fan; a series of impelling blades arranged between said side plates; a deflecting cone having an edge lying substantially in the plane of the opening aforesaid and adapted to devide the air entering the fan into two streams; a plurality of spacers arranged between the outer edge of said deflecting cone and first mentioned side plate and fastening bolts for securing said cone in engagement with said spacers and to said first mentioned side plate.

2. A centrifugal fan of the class described comprising a side plate; a driving pulley; a conical hub extending from the axis of rotation of the fan, and the periphery of which contacts with said first mentioned side plate; a deflecting cone spaced apart from said hub; fastening bolts extending through said deflecting cone, said conical hub and said side plate for fastening said members together; a second side plate spaced apart from said first mentioned side plate and having an opening through which air enters the fan; and a series of impelling vanes arranged between said side plates and extending outwardly from the periphery of said opening and from the circumference of said deflecting cone.

3. A centrifugal fan of the class described comprising two side plates spaced apart from one another; a series of impelling vanes arranged between said side plates; a central opening provided in one of said side plates; a driving pulley carried by one of said side plates; a conical hub; a deflecting cone arranged within the fan and spaced apart from the side plate aforesaid which carries said pulley; and fastening bolts for fastening said last mentioned side plate, said conical hub and said deflecting cone together.

4. A centrifugal fan adapted to operate without an outer casing and to discharge directly into the surrounding atmosphere throughout its entire circumference, said fan comprising side plates spaced apart from one another; a series of impelling blades arranged between said side plates whereby a plurality of air passages are provided; an inlet opening in one of said side plates through which air enters the fan and a plurality of openings extending through one of said side plates and leading from the air passages aforesaid directly into the surrounding atmosphere.

5. A centrifugal fan adapted to operate without an outer casing and to discharge directly into the surrounding atmosphere throughout its entire circumference, said fan comprising side plates spaced apart from one another; a series of impelling vanes arranged between said side plates whereby a plurality of air passages are provided; an inlet opening in one of said side plates through which air enters the fan and openings provided in both of said side plates and leading from the air passages aforesaid directly into the surrounding atmosphere.

6. A centrifugal fan adapted to operate without an outer casing and to discharge directly into the surrounding atmosphere throughout its entire circumference, said fan comprising side plates spaced apart from one another; a series of impelling vanes arranged between said side plates whereby a plurality of air passages are provided; an inlet opening in one of said side plates through which air enters the fan and a plurality of narrow slots provided in said side plates and opening from the air passages aforesaid directly into the surrounding atmosphere.

In testimony whereof I hereto affix my signature.

HORACE W. ASIRE.